C. P. KIMBALL.

Carriage-Seat.

No. 45,050. Patented Nov. 15, 1864.

Witnesses:
F. P. Hale Jr.
J. F. Linnihan

Inventor:
Chas. P. Kimball
by his attorney
R. H. Eddy

UNITED STATES PATENT OFFICE.

CHARLES P. KIMBALL, OF PORTLAND, MAINE.

IMPROVEMENT IN CARRIAGES.

Specification forming part of Letters Patent No. 45,050, dated November 15, 1864.

*To all whom it may concern:*

Be it known that I, CHARLES P. KIMBALL, of Portland, in the county of Cumberland and State of Maine, have made a new and useful invention, having reference to wheel carriages, usually termed "carryalls," or two-seated wagons; and I do hereby declare the same to be fully described in the following specification, and represented in the accompanying drawings, of which—

Figure 1:
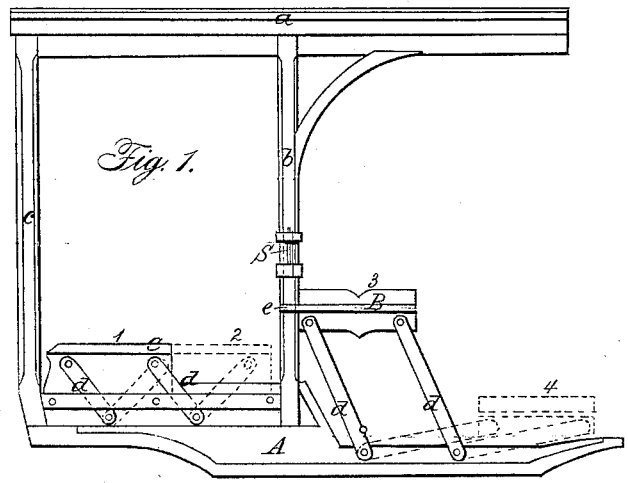
Figure 2:
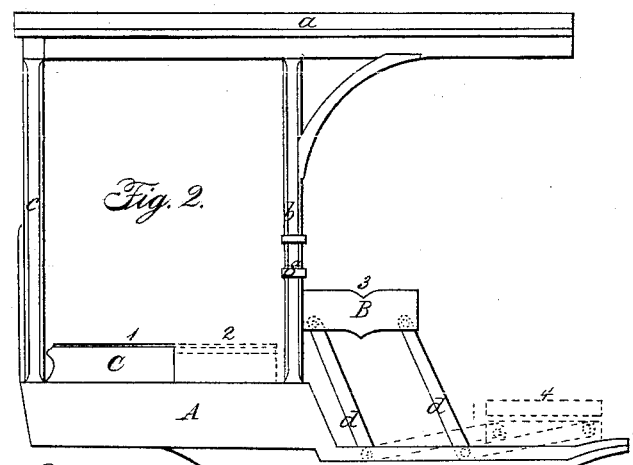
Figure 3:
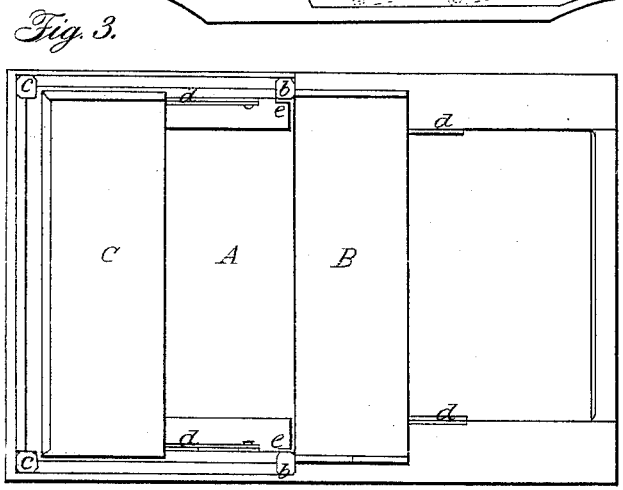

Figure 1 is a side elevation of the body of a carryall provided with my invention. Fig. 2 is a longitudinal section of the same. Fig. 3 is a horizontal section taken through the posts which sustain the top or roof of the body.

The nature of my invention consists in the arrangement and application of a jump-seat, with the floor and posts of the carriage-body in such manner that when such seat may be turned up or back it shall be supported against the said posts and by them and its parallel legs or bars, and when thrown forward it may rest on or near the floor or the supporting-frame thereof; also, in the combination of lateral supporters with a jump-seat so arranged and applied with respect to the body and front posts, such lateral supporters being to operate with the posts in sustaining the jump-seat when thrown back.

In the drawings, A denotes the body of the carriage or covered wagon, of which $a$ is the roof, while $b$ $b$ are the front, and $c$ $c$ the rear, posts for supporting such roof or top. The carriage is represented as "two-seated"— that is to say, it has a front seat, B, and a back seat, C, each seat being connected with the body by two sets of parallel bars, $d$ $d$, each of which is jointed to both seat and body in such manner as to enable the seat to be moved forward or backward into positions, as indicated in Figs. 1 and 2 of the drawings—that is to say, so that the back seat may be moved from its rearmost position, 1, to its foremost position, 2, and the front seat be moved from its rearmost position, 3— viz., against the front posts—forward and down toward or upon the floor or its frame or into the position 4.

When the front seat is thrown into position 4, it will not only be out of the way of a person while entering the carriage, and for the purpose of seating himself on the back seat, but it will constitute a low seat for a child to sit upon. So, when in such position, and the back seat is forward or thrown into position 2, the rear edge of the front seat will or may serve as a support for the feet of a person to bear against while such person may be sitting on the back seat.

It will be seen that the peculiar application of the two jump-seats is productive of advantage, for while such allows the back seat to be moved forward into the position 2 for the purpose of bringing the seat nearer the dasher or into a convenient position for the driver to sit upon it, it also admits of the front seat being thrown down into a convenient position for being used as a child's seat, as well as a support for the legs of the driver or persons who may be sitting on the back seat.

There are applied to the rear edge of the front seat two projections, $e$ $e$, which, when the said seat is turned back against the post, go directly between the two posts and against or close to them, such projections being for the purpose of enabling the posts to support the seat and its parallel bars against strains tending to move it laterally of the carriage, and so as to bend its parallel bars.

In the drawings, S denotes a removable back-strap, which, when in use, extends between the two front posts, and is applied to them in any well-known manner, it being removed from the posts while the back seat is thrown forward.

I herein make no claim to a combination of a back jump-seat with a front seat so hinged to its supports as to be capable of being turned back in order that it may be underneath the back seat when the latter is thrown forward, such being shown in United States Patent No. 16,528, and granted February 3, 1857, to George and David Cook.

What I herein claim is—

1. My arrangement and application of the front jump-seat, B, with the floor and front posts of the carriage-body, the same being in such manner that when such seat may be turned up or back it shall be supported directly against such front posts and by them and its parallel bars or legs, and when thrown forward it may rest upon the floor or the supporting-frame thereof.

2. The combination of the lateral supporters $e$ $e$ with a jump-seat so arranged that when turned back it may be supported by the front posts, as described.

CHAS. P. KIMBALL.

Witnesses:
L. KIDDER,
JOHN JEMMING.